United States Patent
Barsness et al.

(10) Patent No.: US 8,321,520 B2
(45) Date of Patent: Nov. 27, 2012

(54) INTELLIGENT OFFLOAD OF WORK TO HANDLE PEAK ACTIVITY IN AN ENTERPRISE EMAIL SYSTEM

(75) Inventors: Eric L. Barsness, Pine Island, MN (US); Daniel R. Hill, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 12/952,478

(22) Filed: Nov. 23, 2010

(65) Prior Publication Data

US 2012/0131108 A1 May 24, 2012

(51) Int. Cl.
*G06F 15/16* (2006.01)
(52) U.S. Cl. ...................................... 709/207; 709/206
(58) Field of Classification Search .......... 709/206–207, 709/225, 240
See application file for complete search history.

(56) References Cited

U.S. PATENT DOCUMENTS

| | | | | |
|---|---|---|---|---|
| 5,974,465 | A * | 10/1999 | Wong | 709/234 |
| 6,055,564 | A * | 4/2000 | Phaal | 709/207 |
| 8,122,085 | B2 * | 2/2012 | Midgley | 709/206 |
| 2002/0169954 | A1 * | 11/2002 | Bandini et al. | 713/153 |
| 2005/0276222 | A1 * | 12/2005 | Kumar et al. | 370/235 |
| 2006/0027121 | A1 * | 2/2006 | Koekemoer et al. | 102/301 |
| 2006/0168058 | A1 * | 7/2006 | Midgley | 709/206 |
| 2007/0233789 | A1 * | 10/2007 | Agarwal et al. | 709/206 |
| 2008/0109509 | A1 * | 5/2008 | Dickerson et al. | 709/201 |
| 2009/0055489 | A1 * | 2/2009 | Agarwal et al. | 709/206 |
| 2009/0113016 | A1 * | 4/2009 | Sen et al. | 709/207 |
| 2009/0307312 | A1 * | 12/2009 | Ramaswamy | 709/205 |
| 2011/0292808 | A1 * | 12/2011 | Stephens | 370/237 |

* cited by examiner

*Primary Examiner* — Brendan Higa
(74) *Attorney, Agent, or Firm* — Patterson & Sheridan LLP

(57) ABSTRACT

A method and system for sending a message are disclosed. The method involves receiving a message at a mail server and determining that a load of the mail server exceeds a threshold. If it is determined that the load of the mail server exceeds a threshold, then the method involves determining whether the message needs to be sent immediately. If it is determined that the message does not need to be sent immediately, then the method involves delaying sending the message.

21 Claims, 9 Drawing Sheets

Email Message Priority
235

Recipient priority
410

Latest time to send message to each recipient 420

Message priority
430

Latest time to send message to all recipients 440

FIG. 4

Future Load Predictor
235

| Current date, weekday, and time 610 | Tuesday, Sept. 28, 2010, 9:15 AM |
|---|---|
| Peak load times of mail server 620 | Monday – Friday 8 AM – 11 AM & 4 PM – 7 PM |

FIG. 6

INTELLIGENT OFFLOAD OF WORK TO HANDLE PEAK ACTIVITY IN AN ENTERPRISE EMAIL SYSTEM

BACKGROUND

Embodiments of the invention are directed to managing email in an enterprise environment. In particular, embodiments described herein are directed toward intelligent offload of work to handle peak activity in an enterprise email system.

Email messages can be transmitted from a sender to one or more recipients. Email messages can be text messages or can include other content computer-readable files attached to the messages. Email clients typically provide a technique for specifying different recipients either in the "to," "cc" (carbon copy or courtesy copy) or "bcc" (blind carbon copy or blind courtesy copy) fields. In addition, some email clients, allow users to mark a message as having high, average or low importance. These markings are intended to communicate information to the recipient.

Email messages are generally transmitted from a sender to one or more recipients by message transfer agents or one or more mail servers. Mail servers generally communicate with email clients using a client-server architecture. A mail server or message transfer agent (MTA) can receive email messages from either another MTA, a mail submission agent (MSA) or a mail user agent (MUA). MSAs and MUAs implement the client side of the client server model and are thus referred to herein as "email clients."

Email messages, especially those transmitted through corporate mail servers, tend to be sent at identifiable "peak times" of the day and the week. For example, most businesses have typical beginning of the day, end of the day, and lunch hours. Accordingly, company mail servers may operate at a high capacity during the beginning of the day and end of the day hours, while idling or running at a low capacity at night, during the weekend, and during the lunch hour. Additionally, some mail messages are more time-sensitive than others. For example, a manager of group of engineers in New York might arrive in the office at 9:00 AM and send an email to her associates communicating that she wants them all to be present at a meeting at 10:00 AM. In contrast, the same manager could send an email to her son attending a university in California, attaching a family photograph. It is less critical that the email message reaches the son quickly because the son might be sleeping or attending lectures, and would not have time to check his email until later in the afternoon.

SUMMARY

One embodiment of the invention includes a computer-implemented method for processing an email message. The method includes receiving an email message at a mail server, and determining whether a load of the mail server exceeds a threshold. If the load of the mail server exceeds the threshold, then the method involves determining whether the email message needs to be queued for delivery processing upon receipt by the mail server. If the email message does not need to be queued for delivery processing upon receipt by the mail server, then the method involves delaying processing the email message.

Optionally, the step of delaying processing the email message involves delaying processing the email message until the load of the mail server falls below the threshold.

Optionally, the step of delaying processing the email message involves delaying processing the email message until a user-specified amount of time by which the email message can be delayed passes.

Optionally, the method further requires, receiving an indication from a message sender whether the email message needs to be queued for delivery processing upon receipt by the mail server.

Optionally, the step of determining whether the email message needs to be queued for delivery processing upon receipt by the mail server involves: determining that at least a first recipient of the email message is a member of a CC list or a member of a BCC list, and delaying processing the email message for delivery to the first recipient.

Optionally, the step of determining whether the email message needs to be queued for delivery processing upon receipt by the mail server involves: determining that the email message is for a mass distribution list or the email message exceeds a threshold size, and asking a sender of the email message whether the email message needs to be processed in real-time.

Optionally, the method further requires determining that the load of the mail server exceeds the threshold and that the email message needs to be queued for delivery processing upon receipt by the mail server. This step is followed by determining that there is at least one email message that needs to be queued for delivery processing and that is not being queued for delivery processing, and increasing a clock speed of the mail server.

Another embodiment of the invention includes a system for processing an email message having modules that execute the steps described herein.

Another embodiment of the invention includes a computer-readable storage medium storing machine instructions for processing an email message as specified herein.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 4 illustrates data fields stored in the email message priority information, according to an embodiment of the invention.

FIG. 6 illustrates data fields stored in the future load predictor, according to an embodiment of the invention.

DETAILED DESCRIPTION

Figure 1:
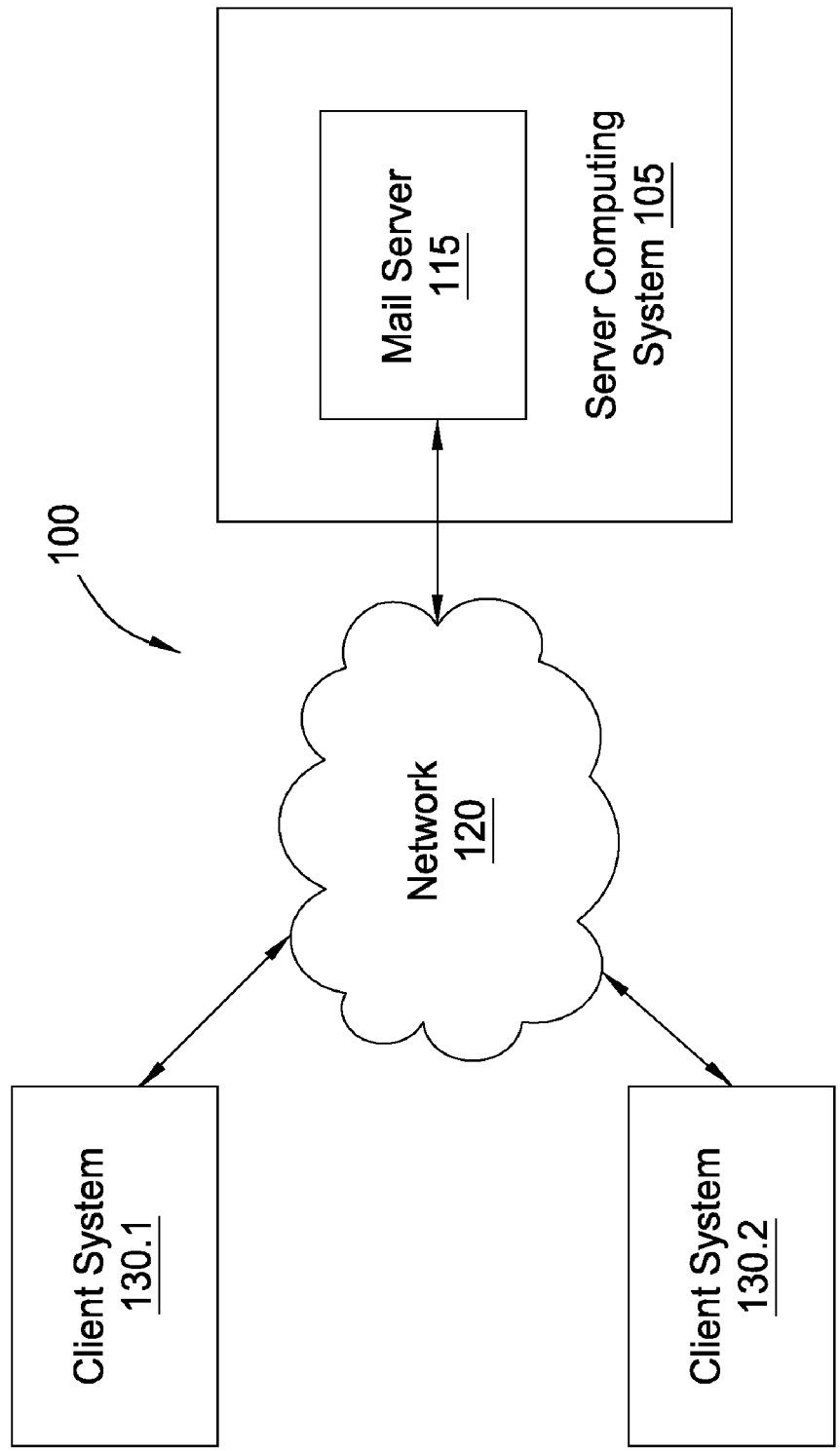
FIG. 1 illustrates a computer system including a mail server computer and a plurality of email client computers, according to an embodiment of the invention.

Embodiments are directed to techniques for intelligently offloading the work of an enterprise email system to handle peak activity period. In one embodiment, an email client receives information as to whether the mail server's load exceeds a threshold. In response, the email client may request priority information from a user regarding messages that the user wants to send. In particular, the user can specify whether a message needs to be sent immediately, or whether the message can be delayed (possibly with a maximum delay period). If the user specifies that the email message can be delayed, the server delays sending the message until either the mail server's load falls below a threshold or the maximum delay period passes. Doing so allows the mail server to delay processing lower-priority messages at during peak times.

Alternatively, an email message is received at a mail server. If the load on the mail server exceeds a threshold, then the mail server determines whether the size of the email message exceeds a threshold. If so, then the sender is prompted as to whether sending the message can be delayed. Similarly, the mail server may determine whether the email message has multiple recipients. If not, then the message is queued for delivery processing upon receipt by the mail server. Therefore, the message is sent to the recipient immediately or in real-time. As another example, the mail server may delay sending messages to CC and BCC recipient lists when the mail server workload exceeds the threshold. The amount of such a delay may be specified by the user or by the administrator of the mail server. If the email message is intended for mass distribution, then the sender is asked whether the message can be sent at a different time. Otherwise, the mail server may prompt the user to indicate whether some of the recipients could receive the message at a different time. Of course, in each of these cases, the mail server eventually delivers message to all recipients.

According to yet another embodiment, the load on the mail server is monitored. The mail server determines whether the mail server is overloaded by many high priority messages that need to be sent without delay. If the workload on the mail server exceeds a threshold (or some high priority messages are not being delivered), then the mail server clock speed is increased to ensure high priority messages are sent with minimal delay.

One skilled in the art would understand that an email message could either be sent immediately in real-time or it can be delayed. Sending a message immediately or in real-time means queuing the message for delivery processing upon receipt by the mail server. Delaying sending a message means, rather than queuing the message for delivery processing upon receipt by the mail server, queuing the message to be sent at a future time. For example, if a message is received on a mail server at 9 AM, it could be delayed by one hour, and queued to be sent at 10 AM. Alternatively, it could be queued for sending in real-time at 9 AM.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access this information from any computing system attached to a network connected to the cloud (e.g., the Internet).

FIG. 1 illustrates a computing system 100 on which embodiments may be implemented. As shown, the computing system includes a server computing system 105 and a plurality of client systems 130, including client system 130.1 and client system 130.2. These systems are connected to one another via a network 120. The network 120 may be Internet, an intranet, a wired or wireless local area network (LAN), a cellular network such as GSM or CDMA, or other computer network.

Illustratively, the server computing system 105 includes a mail server 115, which allows the server to transfer email to and from the client computers 130, as well as to other email servers and email addresses in other networks. The operation of the server computer system is described in more detail below in conjunction with FIG. 3.

Each client system 130 could be a laptop or desktop computer, a virtual machine, a cluster of computers comprising a or a plurality of virtual machines, a PDA or any other computing device or set of devices capable of connecting to a network. The client system is configured to access email messages that are delivered to an email address, through an email client program or through a web browser. The operation of the client computer system is described in more detail below in conjunction with FIG. 2.

Figure 2:
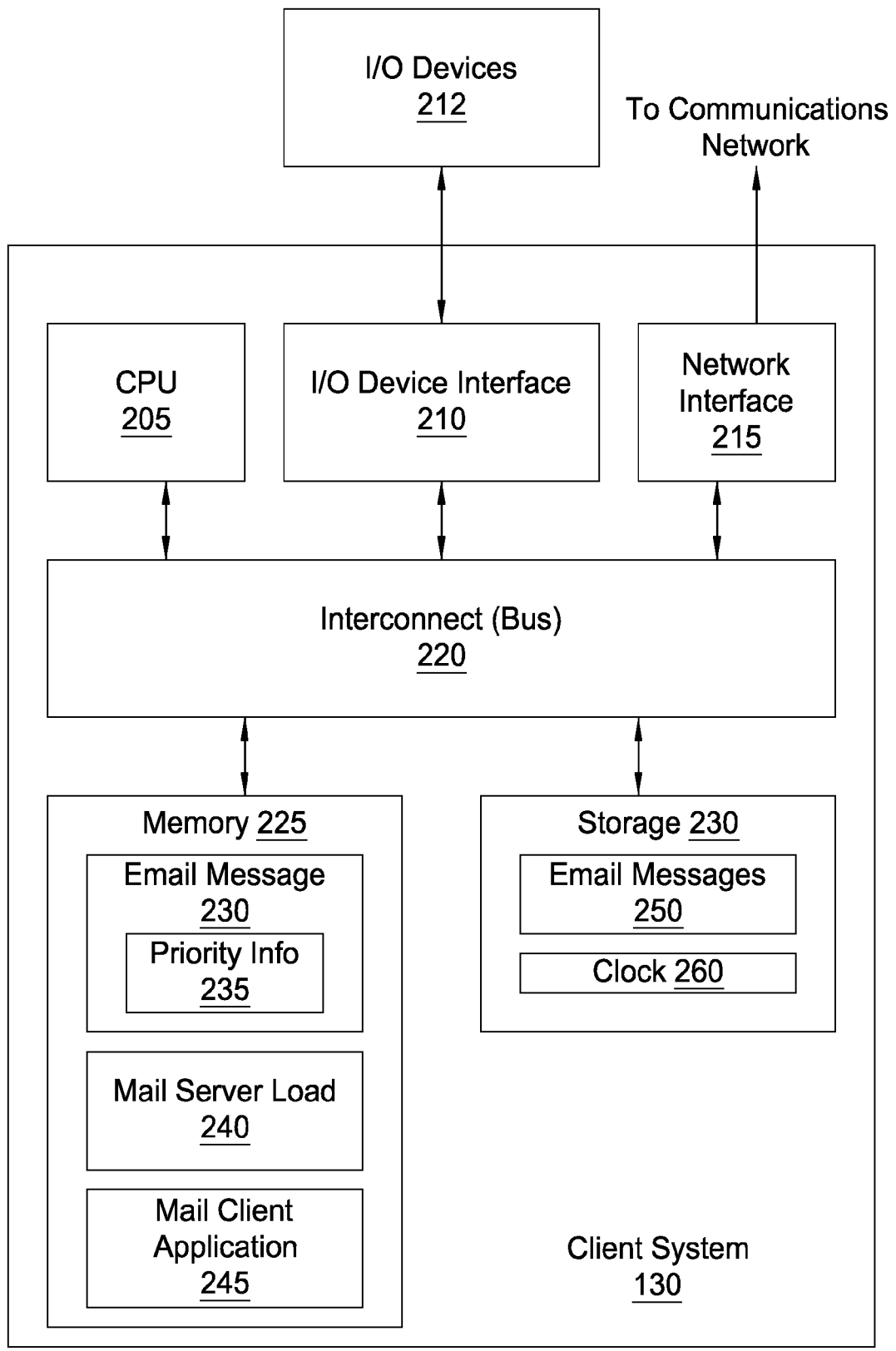
FIG. 2 illustrates a client system, according to an embodiment of the invention.

FIG. 2 illustrates a more detailed view of the client computing system 130 of FIG. 1, according to one embodiment of the invention. As shown, the client computing system 130 includes, without limitation, a central processing unit (CPU) 205, a network interface 215, an interconnect 220, a memory 225, and storage 230. The computing system 105 may also include an I/O devices interface 210 connecting I/O devices 212 (e.g., keyboard, display and mouse devices) to the computing system 105.

The CPU 205 retrieves and executes programming instructions stored in the memory 225. Similarly, the CPU 205 stores and retrieves application data residing in the memory 225. The interconnect 220 is used to transmit programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. Storage 230, such as a hard disk drive or flash memory storage drive, may store non-volatile data.

Illustratively, the memory 225 stores a mail client application 245. The mail client application 245 is configured to receive email messages and present them to the user. In addition, the mail client application 245 provides an interface for a user to compose email messages 230 and to specify the priority information 235 of each message. In one embodiment, the priority information includes information about how soon the message must be delivered and whether some of the recipients need to receive the message earlier than others. The priority information 235 associated with an email message is described in more detail in the discussion of FIG. 4 below. The memory 225 also includes a representation of the mail server load 240. In one embodiment, the mail server load is measured by the percentage of the CPU of the mail server that is being operated. However, one skilled in the art would recognize other measures of mail server load.

Storage 230 includes one or more email messages 250 that were received at an email address associated with the client. The mail client application 245 presents these to the user. The storage 230 also includes a clock 260, which provides a representation of the current time.

Figure 3:
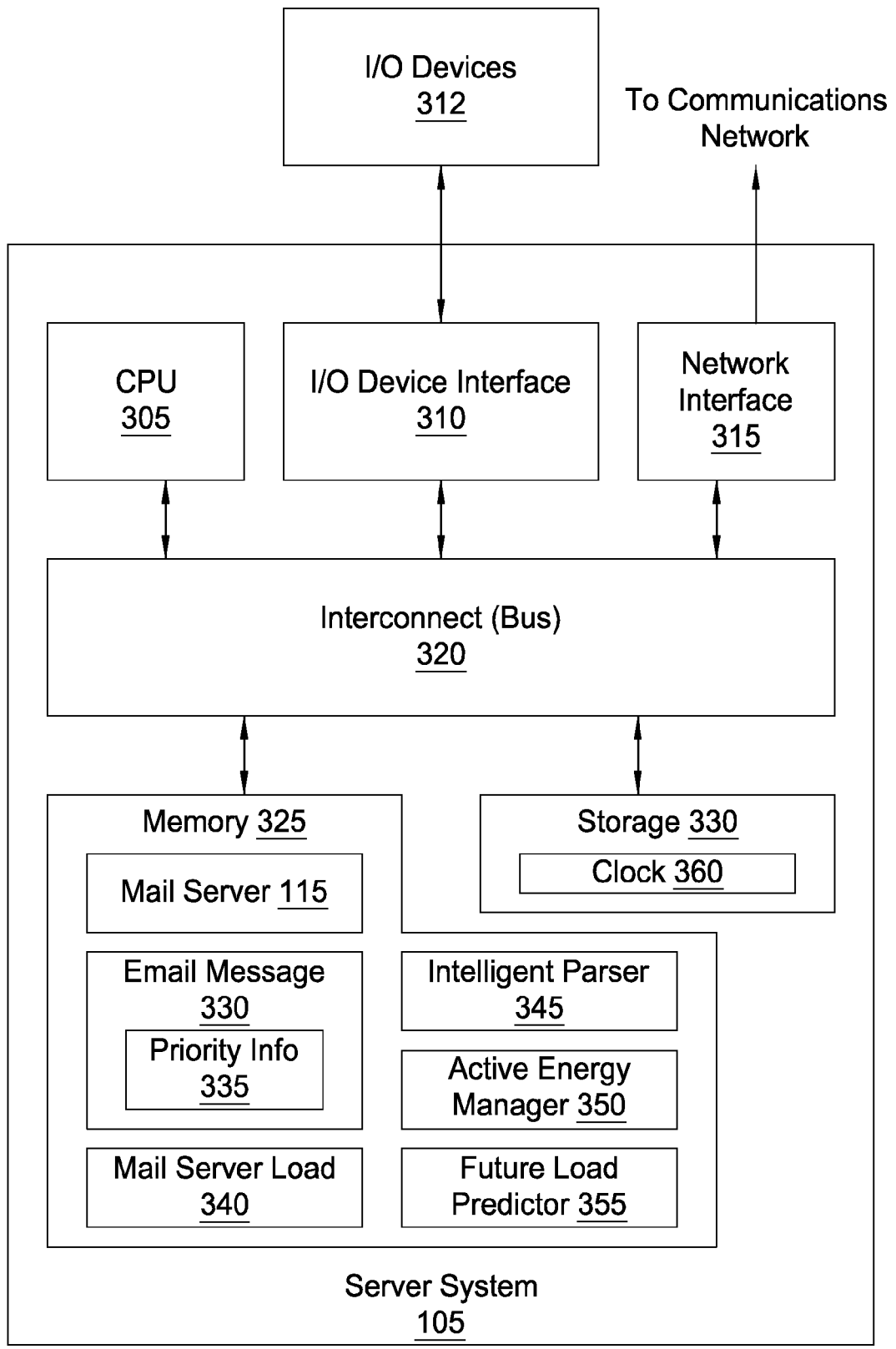
FIG. 3 illustrates a server system, according to an embodiment of the invention.

FIG. 3 is a more detailed view of the server computing system 105 of FIG. 1, according to one embodiment of the invention. As shown, server computing system 105 includes, without limitation, a central processing unit (CPU) 305, a network interface 315, an interconnect 320, a memory 325, and storage 330. The server system 105 may also include an I/O device interface 310 connecting I/O devices 312 (e.g., keyboard, display and mouse devices) to the server computing system 105.

In one embodiment, the client system 130 accesses the server system 105 to download email messages that are to be received at an email address associated with the client system 130 and to send email messages from the email address. The memory 325 of the server system 105 comprises a mail server 115 and one or more email messages 330 having priority information 335, describing how quickly the email message needs to be sent. The memory 325 also stores a representation of the mail server load 340 to determine whether actions need to be taken to reduce this load. In one embodiment, the mail server load 340 is measured as a percentage of the processing speed of the mail server that is used. However, one skilled in the art will recognize other measures of mail server load.

As shown, the memory 325 further includes an intelligent parser 345. The intelligent parser is useful to automatically determine the priority level of a message. The operation of the intelligent parser is described in more detail in the discussion of FIG. 5 below. The memory 325 also includes an active energy manager 350, which includes a module to increase the clock speed of the processor for a short time. Furthermore, the memory includes a future load predictor 355, comprising representations of peak times of server load. On a typical corporate mail server 115, the times of peak server load are the times immediately after the employees arrive in the morning and immediately before the employees leave in the evening. The operation of the future load predictor is described in more detail in conjunction with FIG. 6 below.

As shown, the storage 330 includes a clock 360. The clock 360 stores a representation of time, which may be used by the future load predictor 355 to predict the future load of the mail server.

FIG. 4 illustrates the email message priority 235, which is stored either in the client system or in the server system (email message priority 335) in detail, according to one embodiment of the invention. According to one embodiment, the message could have a single message priority 430 indicating how quickly the message needs to be sent. For example, the priority could be "high," "medium" or "low" with high priority messages requiring delivery within five minutes, medium priority messages requiring delivery within one hour, and low priority messages requiring delivery within 12 hours.

Alternatively, the sender could specify the maximum amount of time to wait until sending the message. According to another embodiment, each of the recipients is assigned a priority 410. For example, an employee could send an email message to her coworker and her supervisor. The employee could specify that the coworker needs to receive the email right away, because the coworker needs the information immediately, but the message to the supervisor can be delayed because it is only being used to generally inform the supervisor about the activities of the employee and the coworker.

As an alternative to specifying a recipient priority 410, a sender of an email message could specify a latest time to send the message to each recipient 420. In the above example, the employee could specify that the coworker must receive the message within ten minutes, while the message to the supervisor could be delayed by two hours. In addition, if there are multiple recipients, the latest time to send the message to all recipients 440 could be specified if the sender does not wish to discriminate between recipients.

Figure 5:
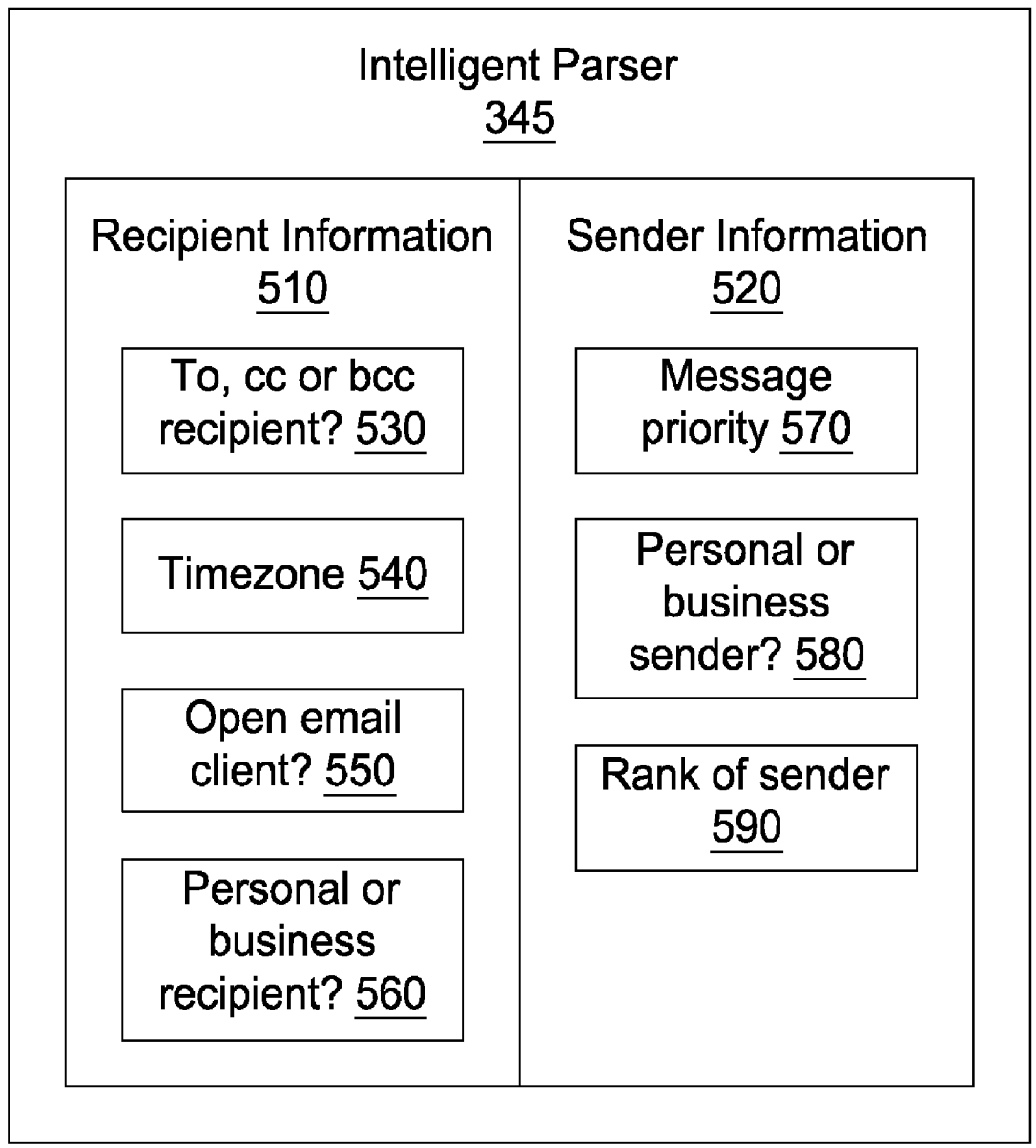
FIG. 5 illustrates data fields stored in the intelligent email parser, according to an embodiment of the invention.

FIG. 5 illustrates an intelligent parser 345 in detail, according to one embodiment of the invention. According to an embodiment, the intelligent parser is used to automatically determine the priority of an email message based on the recipient information 510 and the sender information 520. Useful recipient information 510 includes whether the recipient is identified in the TO, CC or BCC list 530. As one skilled in the art would understand, email users typically specify the primary target audience of a message in the TO list, and use the CC and BCC lists to provide courtesy copies to people who may need to know the contents of the message, but find it less important. Therefore, an intelligent parser 345 might direct the mail server 115 to send the message to recipients in the TO list in real-time, while delaying sending the message to CC and BCC recipients if the server load is above a threshold.

According to one embodiment, the time zone 540 of the recipient, stored with the recipient information 510, is considered in determining whether to send a message to the recipient or to delay it. For example, if a sender in Boston sends an email to a recipient in Los Angeles at 8 AM Eastern Time (5 AM Pacific Time), it may be appropriate to delay sending the message to reduce mail server load 340 because the recipient is likely to be sleeping for a few more hours.

According to another embodiment, the mail server 115 can consider whether the recipient has an open email client 550 to determine whether to delay the message. One skilled in the art would realize that a recipient whose email client is open can read and respond to a message right away. However, a recipient whose email client is not open cannot do so. Therefore, it makes sense to prioritize email messages to recipients whose email clients are open.

In addition, the recipient's identity as a personal or business contact 560 of the sender can be considered in determining the importance of the message. One skilled in the art would recognize multiple techniques for determining, at least with a reasonable probability, whether a recipient is a personal or business contact of the sender. In one embodiment, the content of the message is analyzed. In another embodiment, the source and destination addresses are analyzed to determine whether they are company email addresses or personal email addresses. In yet another embodiment, the mail server 115 stores a list of business contacts. For example, for a law firm mail server, the business contacts include the employees of the firm, as well as the principal clients thereof and the personnel of courts or administrative agencies before which the firm represents the clients.

Sender information 520 that is useful to the intelligent parser 345 includes the message priority 570 set by the sender. As described above, the message priority 570 may include a level, such as "high," "medium" or "low" or a time by which the message must be sent.

In addition, information about whether a personal or business sender 580 is sending the message is useful to the intelligent parser 345 to prioritize business messages, in one embodiment. For example, an email message from a major client to an employee of the law firm should be prioritized over an email message from a social contact. In addition, the rank of the sender 590 is also considered, in one embodiment. For example, if the CEO of a law firm's client writes to a partner at the law firm, this message should be prioritized over an email from a typical engineer at the law firm's client. Of course, one skilled in the art would realize that other embodiments of priority schemes can be used.

FIG. 6 illustrates the future load predictor 235 in detail, according to one embodiment of the invention. In one embodiment, the future load predictor 235 is used to predict the future load of the mail server 115. This is accomplished by storing a representation of the current date, weekday, and time 610, as well as the peak load times of the mail server 620. For example, as illustrated in FIG. 6, the current date, weekday, and time is Tuesday, Sep. 28, 2010, at 9:15 AM. The peak load times of the server are Monday through Friday 8 AM through 11 AM and 4 PM though 7 PM. Based on this information, the future load predictor can predict that the peak load will continue until 11 AM, for another one hour and 45 minutes. In an alternative embodiment, the mail server load can be measured for several weekdays, and a prediction of the peak time of server load could be developed using known statistical modeling techniques.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
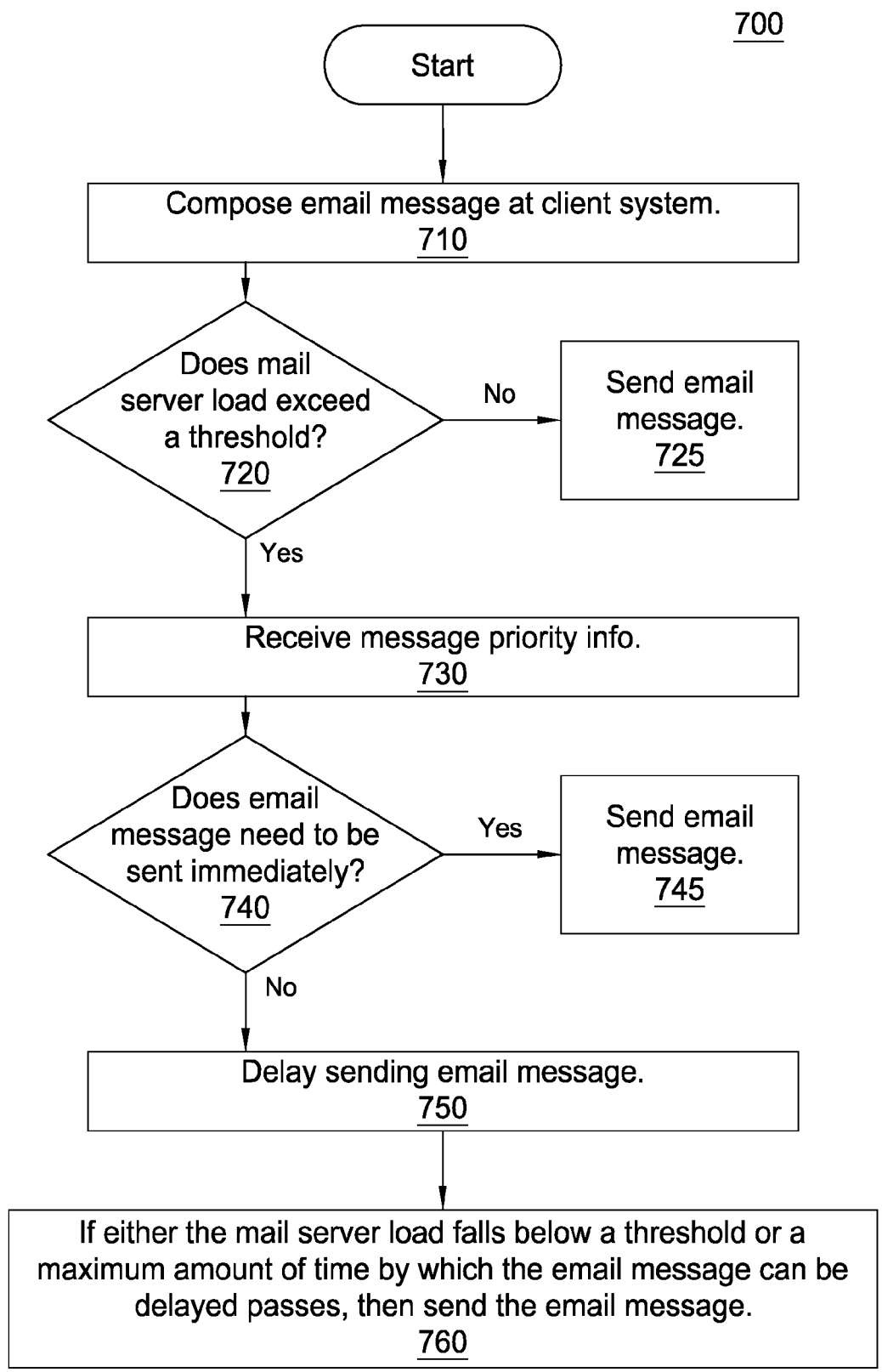
FIG. 7 illustrates a flowchart for a method of sending an email message when the mail server is overloaded and the email message does not need to be sent in real-time, according to an embodiment of the invention.

FIG. 7 illustrates a method 700 for sending an email message when the mail server is overloaded and the email message does not need to be sent in real-time, according to one embodiment of the invention. As shown, the method begins at step 710, when an email message 230 is composed at client system 130. The client system 130 then checks the mail server load 240 to determine whether the mail server load exceeds a threshold (step 720). In an alternative embodiment, this determination is made at the server system 105. If the mail server load 240 does not exceed a threshold, then the email message is sent (step 725). Otherwise, at step 730, the client system 130 receives the message priority information 235. Alternatively, the server system 105 receives the message priority information 335. At step 740, either the client system 130 or the server system 105 determines whether the email message needs to be sent immediately based on the message priority information 235 or 335. If the priority information 235 or 335 indicates that the message needs to be sent immediately, then the message is sent (step 745). Otherwise, at step 750, the mail server 115 delays sending the email message. In step 760, if either the mail server load falls below a threshold or a maximum amount of time by which the email message can be delayed passes, then the mail server queues the message to be processed and delivered. As described in relation to FIG. 4, according to one embodiment, the latest time to send the message can be a single value for the message 440, but can also be different values different recipients. According to another embodiment, the latest time to send the message to all recipients together 430 or to each of the recipients individually 410 could be derived from a message priority value, which is set by the sender, the client system 130 or the server system 105.

Figure 8:
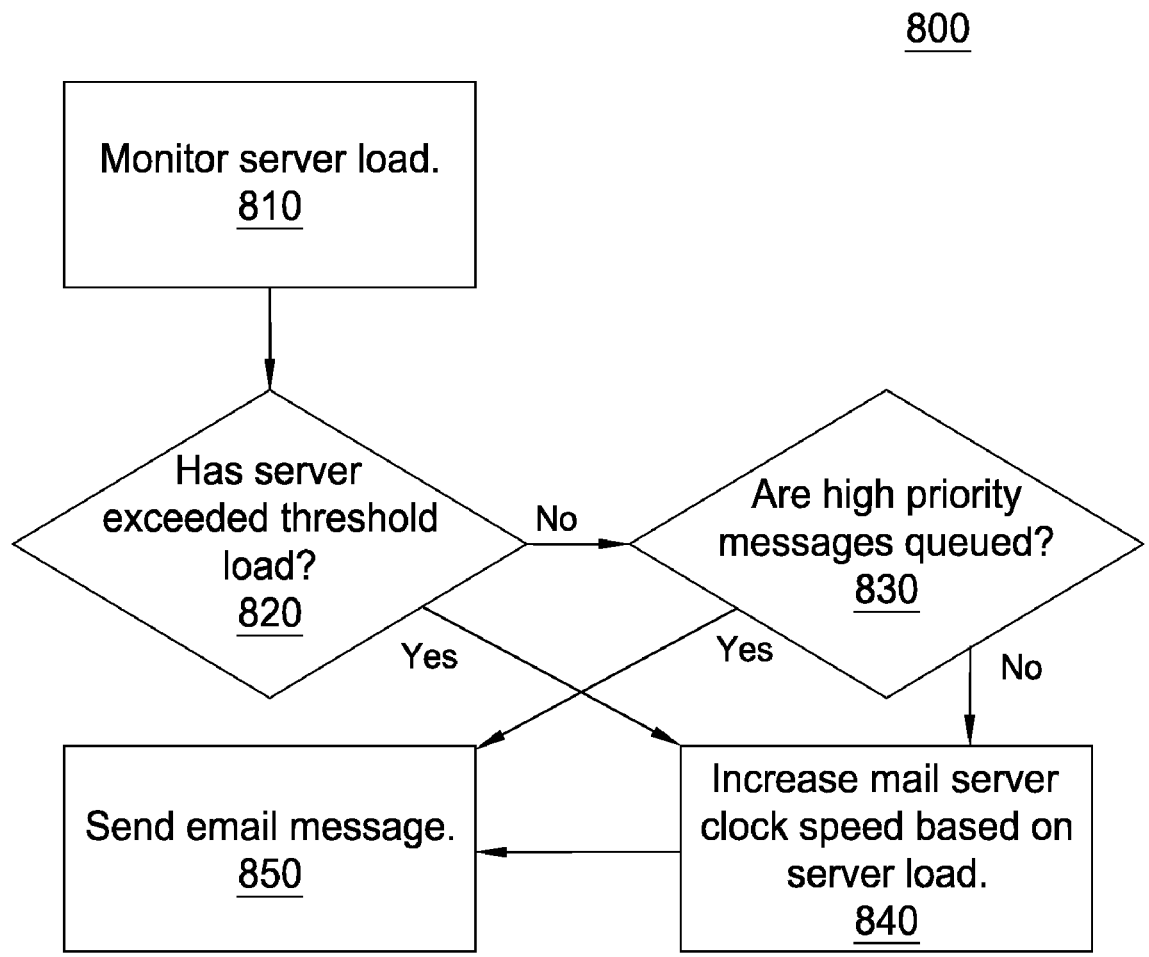
FIG. 8 illustrates a flowchart for a method of sending an email message when the mail server is overloaded and the email message needs to be sent in real-time, according to an embodiment of the invention.

FIG. 8 illustrates a method 800 of sending an email message when the mail server is overloaded and the email message needs to be sent in real-time, according to an embodiment. In step 810, the server system 105 monitors the load 340 of the mail server 115. In step 820, the server system 105 determines whether the mail server load 340 exceeds a threshold load. If not, then the server system determines whether all of the high priority email messages are queued to be sent (step 830). If all of the high priority messages are queued, then the email message is processed for delivery (step 850). However, if the mail server 115 has exceeded a threshold load or high priority messages are not queued, then the mail server clock speed may be increased based on the server load (step 840). In one embodiment, this increase in clock speed is accomplished by an active energy manager module 350. After the clock speed is adjusted, the email message is subsequently processed from the delivery queue (step 850).

Figure 9:
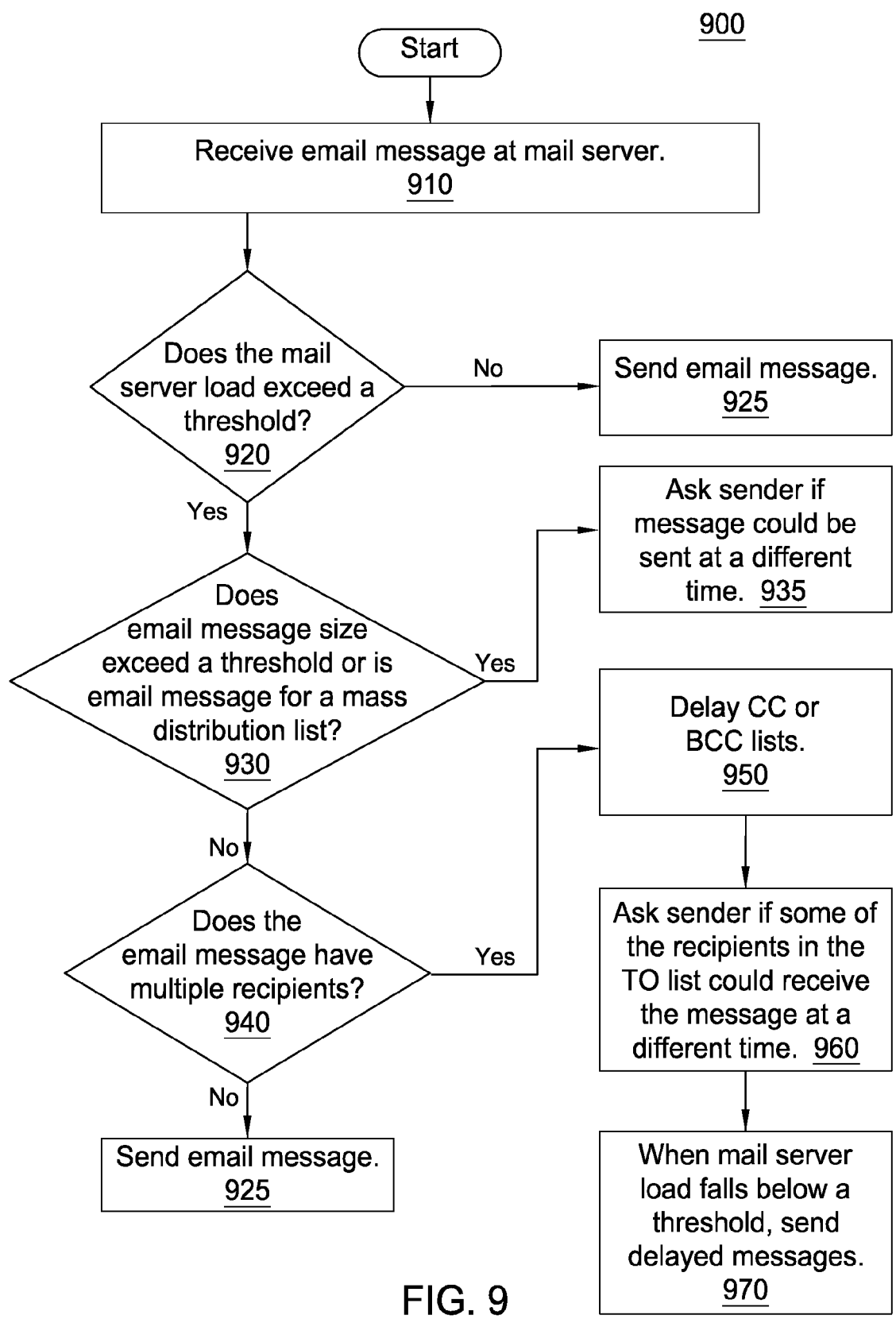
FIG. 9 illustrates a flowchart for a method of processing an email message on a mail server, according to an embodiment of the invention.

FIG. 9A illustrates a method 900 of processing an email message on a mail server, according to one embodiment of the invention. At step 910, an email message 330 is received at a server system 105. The server system 105 then determines whether the mail server load 340 exceeds a threshold (step 920). If not, then the email message is sent (step 925). Otherwise, the server system 105 determines whether the email message size exceeds a threshold or whether the email is for a mass distribution list (step 930). Mass distribution lists are email lists that include a group of people. For example, a law firm with several offices might have a mass distribution list for all of the employees in a single office, all paralegals or all patent attorneys. If the email message size exceeds a threshold or the email message is for a mass distribution list, then the server system 105 asks the sender whether the message can be sent at a different time (step 935). If the sender agrees to delay the message, the message may be delayed either by a time specified by the sender, by a preset amount of time or until the server load decreases below a threshold.

If the email message size does not exceed a threshold and is not intended for a mass distribution list, in step 940, the server system determines whether the message has multiple recipients. It should be noted that a message could have multiple recipients and not be intended for a mass distribution list. For example, a mass distribution list might not exist for all of the attorneys in a law firm who work with a certain client. In this case, a sender would have to individually list all of the email addresses of the recipients in order to write to them. If the email message has only a single recipient, then it is sent without further processing (at step 925). However, if there are multiple recipients, then the CC or BCC lists are delayed 950. In one embodiment, the CC and BCC lists are automatically delayed either by a preset amount of time or until the mail server load 340 falls below a threshold. In another embodiment, the delay of the CC and BCC lists is configurable by the sender of the email message. This configuration is either set specifically for every message or a default setting is installed when the mail client is set up.

The method of FIG. 9A is continued in FIG. 9B. After the CC or BCC lists are delayed, in step 960, the server system 105 asks the sender if some of the recipients in the TO list could receive the message at a different time. The mail server 115 then follows the sender's instructions in determining when to send the message. In step 970, when the mail server load 340 falls below a threshold, the mail server 340 sends the delayed messages.

Advantageously, embodiments of the invention provide techniques for intelligently offloading the work of an enterprise email system to handle peak activity period. During a peak activity period, the mail server determines, either automatically or based on input from the sender, whether a message needs to be sent in real-time or whether the message can be delayed by a certain period. If the message needs to be sent in real-time, the message is queued for delivery in real-time. If the message can be delayed by a certain period, then the queuing for delivery of the message is delayed until either the period passes or the mail server load falls below a threshold.

While the foregoing is directed to embodiments of the present invention, other and further embodiments of the invention may be devised without departing from the basic scope thereof, and the scope thereof is determined by the claims that follow.

What is claimed is:

1. A computer-implemented method of processing an email message, comprising:
    receiving an email message at a mail server;
    determining whether a load of the mail server exceeds a threshold;
    upon determining the load of the mail server exceeds the threshold, determining whether the email message needs to be queued for delivery processing upon receipt by the mail server, comprising:
        determining that at least a first recipient of the email message is a member of a CC list or a member of a BCC list; and
        delaying processing of the email message for delivery to the first recipient; and
    upon determining the email message does not need to be queued for delivery processing upon receipt by the mail server, delaying processing the email message.

2. The method of claim 1, wherein delaying processing the email message comprises:
    delaying processing the email message until the load of the mail server falls below the threshold.

3. The method of claim 1, wherein the step of delaying processing the email message comprises:
    delaying processing the email message until a user-specified amount of time by which the email message can be delayed passes.

4. The method of claim 1, further comprising, receiving an indication from a message sender whether the email message needs to be queued for delivery processing upon receipt by the mail server.

5. The method of claim 1, further comprising:
    determining that the load of the mail server exceeds the threshold and that the email message needs to be queued for delivery processing upon receipt by the mail server;
    determining that there is at least one email message that needs to be queued for delivery processing and that is not being queued for delivery processing; and
    increasing a clock speed of the mail server.

6. A system, comprising:
    one or more computer processors; and
    a memory containing a program which, when executed by the one or more computer processors, performs an operation to process an email message, the operation comprising:
        receiving an email message at a mail server;
        determining whether a load of the mail server exceeds a threshold;
        upon determining the load of the mail server exceeds the threshold, determining whether the email message received at the mail server needs to be queued for delivery processing upon receipt by the mail server, comprising one of:
            (i) determining that at least a first recipient of the email message is a member of a CC list or a member of a BCC list; and
            delaying processing of the email message for delivery to the first recipient, and
            (ii) determining that the email message is for a mass distribution list or the email message exceeds a threshold size; and
            asking a sender of the email message whether the email message needs to be queued for delivery processing upon receipt by the mail server; and
        delaying processing the email message upon determining the email message does not need to be queued for delivery processing upon receipt by the mail server.

7. The system of claim 6, wherein delaying processing the email message comprises:
    delaying processing the email message until the load of the mail server falls below the threshold.

8. The system of claim 7, wherein delaying processing the email message comprises:
    delaying processing the email message until a user-specified amount of time by which the email message can be delayed passes.

9. The system of claim 8, the operation further comprising:
    receiving an indication from a message sender whether the email message needs to be queued for delivery processing upon receipt by the mail server.

10. The system of claim 9, wherein determining whether the email message received at the mail server needs to be queued for delivery processing upon receipt by the mail server comprises:
    determining that at least a first recipient of the email message is a member of a CC list or a member of a BCC list; and
    delaying processing the email message for delivery to the first recipient.

11. The system of claim 10, wherein determining whether the email message received at the mail server needs to be queued for delivery processing upon receipt by the mail server comprises:
    determining that the email message is for a mass distribution list or the email message exceeds a threshold size; and
    asking a sender of the email message whether the email message needs to be processed in real-time.

12. The system of claim 11, the operation further comprising:
    determining that the load of the mail server exceeds the threshold and that the email message needs to be queued for delivery processing upon receipt by the mail server;
    determining that there is at least one email message that needs to be queued for delivery processing and that is not being queued for delivery processing; and
    increasing a clock speed of the mail server.

13. A computer-readable storage medium storing machine instructions for processing an email message, the instructions comprising:
    receiving an email message at a mail server;
    determining whether a load of the mail server exceeds a threshold;
    upon determining the load of the mail server exceeds the threshold, determining whether the email message needs to be queued for delivery processing upon receipt by the mail server, comprising one of:

(i) determining that at least a first recipient of the email message is a member of a CC list or a member of a BCC list; and delaying processing of the email message for delivery to the first recipient, and (ii) determining that the email message is for a mass distribution list or the email message exceeds a threshold size; and asking a sender of the email message whether the email message needs to be queued for delivery processing upon receipt by the mail server; and upon determining the email message does not need to be queued for delivery processing upon receipt by the mail server, delaying processing the email message.

14. The medium of claim 13, wherein the instructions for delaying processing the email message comprises:

delaying processing the email message until the load of the mail server falls below the threshold.

15. The medium of claim 13, wherein instructions for delaying processing the email message comprise:

delaying processing the email message until a user-specified amount of time by which the email message can be delayed passes.

16. The medium of claim 13, wherein the instructions further comprise, receiving an indication from a message sender whether the email message needs to be queued for delivery processing upon receipt by the mail server.

17. The medium of claim 13, wherein determining whether the email message needs to be queued for delivery processing upon receipt by the mail server comprises:

determining that at least a first recipient of the email message is a member of a CC list or a member of a BCC list; and delaying processing the email message for delivery to the first recipient.

18. The medium of claim 13, wherein determining whether the email message needs to be queued for delivery processing upon receipt by the mail server comprises:

determining that the email message is for a mass distribution list or the email message exceeds a threshold size; and asking a sender of the email message whether the email message needs to be processed in real-time.

19. The medium of claim 13, wherein the instructions further comprise:

determining that the load of the mail server exceeds the threshold and that the email message needs to be queued for delivery processing upon receipt by the mail server;

determining that there is at least one email message that needs to be queued for delivery processing and that is not being queued for delivery processing; and increasing a clock speed of the mail server.

20. A computer-readable storage medium storing machine instructions for processing an email message, the instructions comprising:

receiving an email message at a mail server;

determining that a load of the mail server exceeds a threshold;

determining that the email message needs to be queued for delivery processing upon receipt by the mail server;

determining that there is at least one email message that needs to be queued for delivery processing and that is not being queued for delivery processing; and responsive to determining that there is at least one email message that needs to be queued for delivery processing and that is not being queued for delivery processing, increasing a clock speed of the mail server.

21. A computer-readable storage medium storing machine instructions for processing an email message, the instructions comprising:

receiving an email message at a mail server;

determining whether a load of the mail server exceeds a threshold;

upon determining the load of the mail server exceeds the threshold, determining whether the email message needs to be queued for delivery processing upon receipt by the mail server, comprising:

determining that the email message is for a mass distribution list or the email message exceeds a threshold size; and asking a sender of the email message whether the email message needs to be processed in real-time; and upon determining the email message does not need to be queued for delivery processing upon receipt by the mail server, delaying processing the email message.

* * * * *